(12) United States Patent
Song et al.

(10) Patent No.: US 12,717,072 B2
(45) Date of Patent: Aug. 25, 2026

(54) TRANSPARENT PLATE AND FABRICATING METHOD THEREFOR, HOUSING, AND MOBILE TERMINAL

(71) Applicant: BYD COMPANY LIMITED, Shenzhen (CN)

(72) Inventors: Xinxin Song, Shenzhen (CN); Le Zhang, Shenzhen (CN); Lan Ma, Shenzhen (CN); Liang Chen, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 647 days.

(21) Appl. No.: 18/124,200

(22) Filed: Mar. 21, 2023

(65) Prior Publication Data

US 2023/0236346 A1 Jul. 27, 2023

Related U.S. Application Data

(63) Continuation of application No. PCT/CN2021/117261, filed on Sep. 8, 2021.

(30) Foreign Application Priority Data

Sep. 28, 2020 (CN) ......................... 202011043105.7

(51) Int. Cl.
*G02B 5/18* (2006.01)
*B44F 1/06* (2006.01)
*G02B 27/60* (2006.01)

(52) U.S. Cl.
CPC .............. *G02B 5/1866* (2013.01); *B44F 1/06* (2013.01); *G02B 5/1814* (2013.01); *G02B 5/1857* (2013.01); *G02B 27/60* (2013.01)

(58) Field of Classification Search
None
See application file for complete search history.

(56) References Cited

U.S. PATENT DOCUMENTS 6,124,975 A * 9/2000 Dona ........................ B44F 1/10 359/619
2009/0225419 A1* 9/2009 Tamai .................. G02B 3/0043 359/463

(Continued)

FOREIGN PATENT DOCUMENTS

CN 101266401 A 9/2008
CN 201233452 Y 5/2009

(Continued)

OTHER PUBLICATIONS

International Search Report and Written Opinion for Application No. PCT/CN2021/117261, mailed on Nov. 18, 2021, 11 pages.

*Primary Examiner* — Derek S. Chapel
(74) *Attorney, Agent, or Firm* — Sheppard Mullin Richter & Hampton LLP

(57) ABSTRACT

A transparent plate includes: a grating structure layer, including a first surface and a second surface opposite to each other, where a grating structure is disposed on the first surface; and a micro-texture layer, disposed on the second surface, where a surface of the micro-texture layer away from the second surface includes a plurality of micro-texture stripes, and light interferes between the grating structure and the micro-texture layer and forms moire stripes.

20 Claims, 8 Drawing Sheets

(56) References Cited

U.S. PATENT DOCUMENTS

| | | | | |
|---|---|---|---|---|
| 2012/0314293 | A1* | 12/2012 | Chang | G02B 30/27<br>359/580 |
| 2013/0342910 | A1* | 12/2013 | Schaur | B44F 1/06<br>359/577 |
| 2022/0248552 | A1* | 8/2022 | Li | H05K 5/0243 |
| 2024/0371066 | A1* | 11/2024 | Parrat | B42D 25/351 |

FOREIGN PATENT DOCUMENTS

| | | | | |
|---|---|---|---|---|
| CN | 207954907 | U | 10/2018 | |
| CN | 110493987 | A | 11/2019 | |
| CN | 210047258 | U | 2/2020 | |
| CN | 210652481 | U | 6/2020 | |
| CN | 211378445 | U | 8/2020 | |
| JP | 2006-002272 | A | 1/2006 | |
| KR | 101164229 | B1 | 7/2012 | |
| WO | WO-2007146634 | A2 * | 12/2007 | G06F 3/0202 |

* cited by examiner 22
11

TRANSPARENT PLATE AND FABRICATING METHOD THEREFOR, HOUSING, AND MOBILE TERMINAL

CROSS-REFERENCE TO RELATED APPLICATION

This application is a Continuation Application of International Patent Application No. PCT/CN2021/117261, filed on Sep. 8, 2021, which is based on and claims priority to and benefits of Chinese Patent Application No. 202011043105.7, filed on Sep. 28, 2020. The entire content of all of the above-referenced application is incorporated herein by reference.

FIELD

The present disclosure relates to the technical field of electronic products, and more particular, to a transparent plate and a fabricating method therefor, a housing, and a mobile terminal.

BACKGROUND

In response to the continuous development of electronic products, people have increasingly high requirements for texture and aesthetic appearance of mobile terminals such as mobile phones, tablets, and smart watches. A visual effect of an appearance is an important factor that will be taken into consideration by a buyer. In the related art, a housing of a mobile terminal is usually decorated with a micro-nano structure. However, the appearance of the micro-nano structure in the related art is simple, and a dynamic optical effect cannot be realized. As a result, the decoration on the appearance of the housing of the mobile terminal is relatively simple, which cannot satisfy the increasingly large market demand.

Therefore, the related art of the existing mobile terminal housing still needs to be improved.

SUMMARY

The present disclosure resolves one of technical problems in the related art. The present disclosure is to provide a transparent plate that has a simple structure and can realize a dynamic visual effect or an expressive effect.

In a first aspect of the present disclosure, the present disclosure provides a transparent plate. According to an embodiment of the present disclosure, the transparent plate includes: a grating structure layer, including a first surface and a second surface opposite to each other, where a grating structure is disposed on the first surface; and a micro-texture layer, disposed on the second surface, where a surface of the micro-texture layer away from the second surface includes a plurality of micro-texture stripes, and light interferes between the grating structure and the micro-texture layer and forms moire stripes. The transparent plate has a simple structure and can realize a dynamic visual effect or an expressive effect.

In a second aspect of the present disclosure, the present disclosure provides a method for fabricating the transparent plate described above. According to an embodiment of the present disclosure, the method includes: forming a micro-texture layer on the second surface of the grating structure layer to obtain the transparent plate. The method can be easily operated, has a strong stability and a high yield, facilitates industrial production, and can effectively produce the transparent plate described above.

In a third aspect of the present disclosure, the present disclosure provides a housing. According to an embodiment of the present disclosure, the housing includes the transparent plate described above. The housing has a simple structure, can realize a dynamic visual effect and an expressive effect, and has the features and advantages of the transparent plate described above, which are not repeated herein.

In a fourth aspect of the present disclosure, the present disclosure provides a mobile terminal. According to an embodiment of the present disclosure, the mobile terminal includes the housing described above. The mobile terminal can realize a dynamic visual effect and an expressive effect, and has the features and advantages of the housing described above, which are not repeated herein.

REFERENCE NUMERALS

Figure 1:
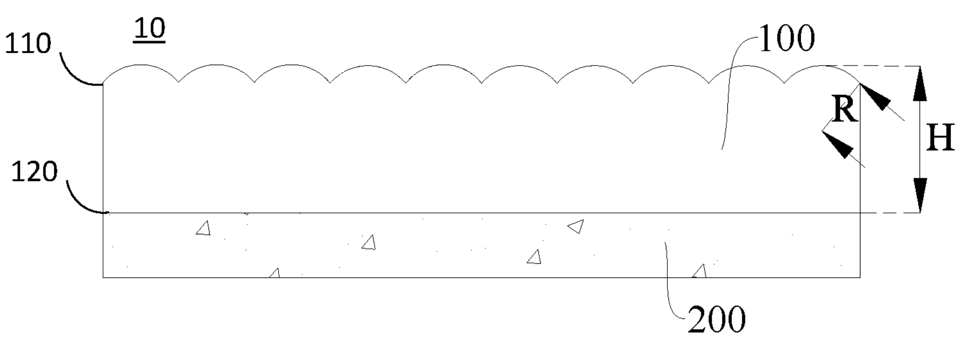
FIG. 1 is a schematic diagram of a cross-sectional view of a transparent plate according to an embodiment of the present disclosure.

Transparent plate 10;

Grating structure layer 100; a first surface 110 of the grating structure layer 100; a second surface 120 of the grating structure layer 100;

Micro-texture layer 200; Micro-texture unit 210; First subunit 211; Second subunit 212; Third subunit 213; Fourth subunit214; Micro-texture stripe 11, 22; Gap 91; Connecting portion 92; Substrate layer 300; Optical coating layer 400.

DETAILED DESCRIPTION

Embodiments of the present disclosure are described below in detail. The embodiments described below are exemplary and used only for explaining the present disclosure, and does not limit the present disclosure. The embodiments in which specific technologies or conditions are not indicated shall be carried out in accordance with the technologies or conditions described in the art or in accordance with the product specification.

In an aspect of the present disclosure, the present disclosure provides a transparent plate. According to an embodiment of the present disclosure, referring to FIG. 1, the transparent plate 10 includes: a grating structure layer 100, including a first surface 110 and a second surface 120 arranged opposite to each other, where the first surface is provided with a grating structure (for example, a surface away from a micro-texture layer 200 shown in FIG. 1); and the micro-texture layer 200, disposed on the second surface, where a surface of the micro-texture layer 200 away from the second surface includes a plurality of micro-texture stripes arranged in sequence (not shown in FIG. 1, and the structure of the micro-texture stripes is detailed below); and light interferes between the grating structure and the micro-texture layer 200 and forms moire stripes. The transparent plate 10 has a simple structure, and through the coupling between the grating structure layer 100 and the micro-texture layer 200, when a user observes the transparent plate, if an angle of view of the user is translated relative to the transparent plate (for example, the human eye moves from left to right), a different pattern is observed at a different position due to a change of an imaging focal point, thus realizing a dynamic visual effect and an expressive effect.

Figure 2:
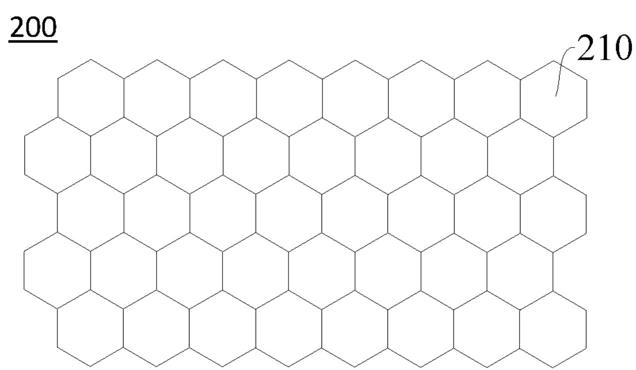
FIG. 2 is a schematic diagram of a planar view of a micro-texture layer according to an embodiment of the present disclosure.
Figure 3A:
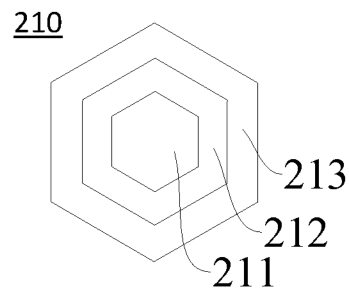
FIG. 3*a* is an enlarged view of a micro-texture unit in the embodiment of FIG. 2.

According to an embodiment of the present disclosure, referring to FIG. 2, the micro-texture layer 200 may include a plurality of micro-texture units 210 arranged in sequence. Referring to FIG. 3*a*, each of the micro-texture units includes plurality of subunits, wherein the plurality of subunits comprises at least a first subunit 211, a second subunit 212, and a third subunit 213 nested in sequence, and the first subunit, the second subunit, and the third subunit include micro-texture stripes. The micro-texture stripes of at least two of the plurality of subunits have different patterns. That is to say, each of the micro-texture units includes the first subunit 211, the second subunit 212, and the third subunit 213, for example. In the micro-texture unit, the micro-texture stripes of the first subunit 211 and the second subunit 212 have different patterns, or the micro-texture stripes of the second subunit 212 and the third subunit 213 have different patterns, or the micro-texture stripes of the first subunit 211 and the third subunit 213 have different patterns, or the micro-texture stripes of the first subunit 211, the second subunit 212, and the third subunit 213 have different patterns. Through the micro-texture layer 200 arranged in such a way, if the angle of view of the user is translated relative to the transparent plate, more different patterns can be observed at different positions due to a change of the imaging focal point, thus realizing a richer dynamic visual effect and a more expressive effect.

Figure 3B:
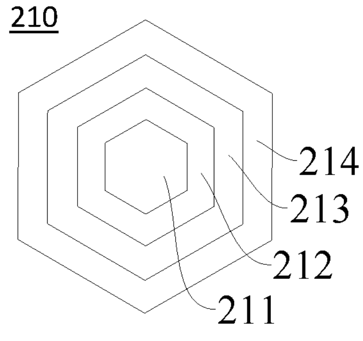
FIG. 3*b* is an enlarged view of a micro-texture unit according to another embodiment of the present disclosure.

According to this embodiment of the present disclosure, the micro-texture unit described above includes the first subunit 211, the second subunit 212, and the third subunit 213. In some embodiments of the present disclosure, referring to FIG. 3*b*, the micro-texture layer further includes a fourth subunit 214, and the fourth subunit 214 surrounds the third subunit 213, so as to realize a richer dynamic effect.

Figures 4A, 4B, 4C, 5:
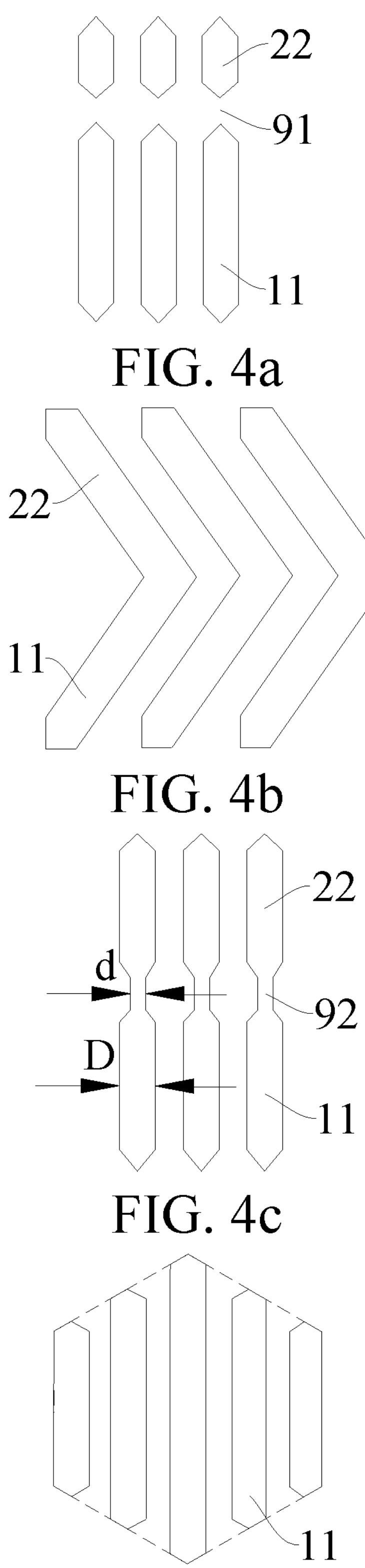
FIG. 4*a*, FIG. 4*b*, and FIG. 4*c* are diagrams illustrating planar views of three different micro-texture units according to the present disclosure.
FIG. 5 is a schematic diagram of a planar view of a subunit in a micro-texture unit according to the present disclosure.

In addition, according to this embodiment of the present disclosure, the micro-texture stripes of the different subunits in the micro-texture unit may be arranged in different ways. Referring to FIG. 4*a*, FIG. 4*b*, and FIG. 4*c*, the first subunit and the second subunit in the micro-texture unit are used as an example. The micro-texture unit has a plurality of micro-texture stripes, including micro-texture stripes 11 of the first subunit and micro-texture stripes 22 of the second subunit. The micro-texture stripes 11 and micro-texture stripes 22 may be demarcated in the following ways. For example, in some embodiments of the present disclosure, a gap is formed between first micro-texture stripes of a first one of two adjacent subunits and second micro-texture stripes of a second one of the two adjacent subunits in the same micro-texture unit. In some embodiments of the present disclosure, a gap is formed between first micro-texture stripes of the first subunit and second micro-texture stripes of the second subunit, or a gap is formed between second micro-texture stripes of the second subunit and third micro-texture stripes of the third subunit. Referring to FIG. 4*a*, a gap 91 exists between the micro-texture stripes 11 of the first subunit and the micro-texture stripes 22 of the second subunit. In some embodiments of the present disclosure, a first micro-texture stripe of a first one of two adjacent subunits and a second micro-texture stripe of a second one of the two adjacent subunits in the same micro-texture unit that are connected to each other extend in different directions. Referring to FIG. 4*b*, the micro-texture stripes 11 of the first subunit and the micro-texture stripes 22 of the second subunit extend in different directions. In some embodiments of the present disclosure, the micro-texture stripes of the two adjacent subunits in the same micro-texture unit are connected at a connecting portion, wherein two ends of the connecting portion are respectively connected with the first micro-texture stripes of the first one of the two adjacent subunits and the second micro-texture stripes of the second one of the two adjacent subunits, and a width of the connecting portion is not greater than half of a width of each of the micro-texture stripes of the two adjacent subunits. Referring to FIG. 4*c*, a connecting portion 92 is arranged between the micro-texture stripes 11 of the first subunit and the micro-texture stripes 22 of the second subunit, and a width d of the connecting portion is not greater than a width D of the micro-texture stripe. In this way, the micro-texture stripes of the micro-texture unit are divided into a plurality of different subunits. In the different subunits, the micro-texture stripes form different patterns, thereby realizing a richer dynamic visual effect.

Figures 6, 7:
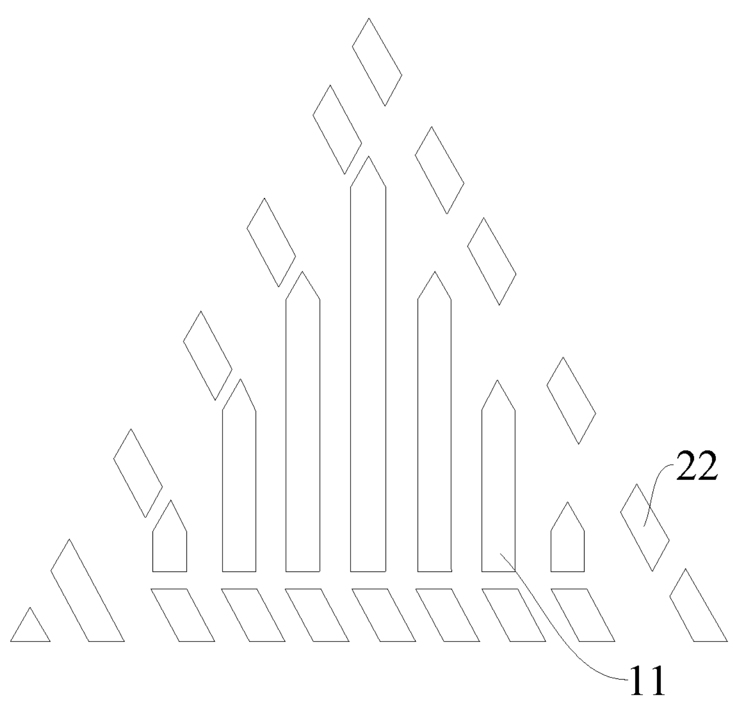
FIG. 6 is a schematic diagram of a planar view of another micro-texture unit according to the present disclosure.
FIG. 7 is a schematic diagram of a planar view of another micro-texture unit according to the present disclosure.

According to this embodiment of the present disclosure, the patterns formed by the micro-texture stripes of the different subunits in the micro-texture unit are not limited. For example, in some embodiments of the present disclosure, the micro-texture stripes have edges facing the outside of each of the subunits, a connecting line of the edges which facing the outside of the subunit of micro-texture stripes in the same subunit forming a polygon or a circle, and the polygons formed by the different subunits have an equal number of sides. Referring to FIG. 5, FIG. 5 shows a first subunit of a micro-texture unit, in which a connecting line of edges of micro-texture stripes facing the outside of the first subunit form a hexagon (shown by dashed lines in FIG. 5). FIG. 6 shows a first subunit and a second subunit of a micro-texture unit, and a connecting line of edges of micro-texture stripes 11 of the first subunit facing the outside of the first subunit form a triangle. Likewise, a connecting line of edges of micro-texture stripes 22 of the second subunit facing the outside of the second subunit forms a triangle. Referring to FIG. 7, a connecting line of edges of micro-texture stripes 11 of the first subunit facing the outside of the first subunit form a circle. Likewise, a connecting line of edges of micro-texture stripes 22 of the second subunit facing the outside of the second subunit forms a circle. In addition, a person skilled in the art may understand that the connecting line of the edges of the plurality of micro-texture stripes of the same subunit may form a quadrangle, a pentagon, a star, or the like. By forming the micro-texture stripes described above into different shapes, different dynamic visual effects are realized, which significantly improves the competitiveness of the transparent plate for application to the mobile terminal housing.

According to some embodiments of the present disclosure, the micro-texture stripes of the micro-texture unit can further have much richer changes. For example, in some embodiments of the present disclosure, when the micro-texture stripes are straight, the micro-texture stripes of two adjacent subunits in the same micro-texture unit extend in different directions. Referring to FIG. 6, the micro-texture stripes 11 of the first subunit and the micro-texture stripes 22 of the second subunit extend in different directions. In some embodiments of the present disclosure, when the plurality of micro-texture stripes of the same subunit extend in the same direction, the micro-texture stripes of the plurality of subunits in the micro-texture unit extend in different directions. For example, a micro-texture unit includes a first subunit, a second subunit, and a third subunit. micro-texture stripes of the first subunit, micro-texture stripes of the second subunit, and micro-texture stripes of the third subunit may extend in different directions.

For another example, in some embodiments of the present disclosure, when the micro-texture stripes are curved lines, the micro-texture stripes of two adjacent subunits in the same micro-texture unit have different curvatures. Referring to FIG. 7, the micro-texture stripes 11 of the first subunit and the micro-texture stripes 22 of the second subunit have different curvatures. In some embodiments of the present disclosure, when the plurality of micro-texture stripes of the same subunit extend in the same direction, the micro-texture stripes of the plurality of subunits in the micro-texture unit have different curvatures. For example, a micro-texture unit includes a first subunit, a second subunit, and a third subunit. micro-texture stripes of the first subunit, micro-texture stripes of the second subunit, and micro-texture stripes of the third subunit may have different curvatures.

In conclusion, through the micro-texture stripes, the appearance realizes richer changes, and through the mating/coupling between the grating structure layer 100 and the micro-texture layer 200, when a user observes the transparent plate, if an angle of view of the user is translated relative to the transparent plate (for example, the human eye moves from left to right), much richer patterns are observed at a different position due to different degrees of changes of an imaging focal point, thus realizing a much richer dynamic visual effect and a significantly improved expressive effect for products.

Figure 8A:
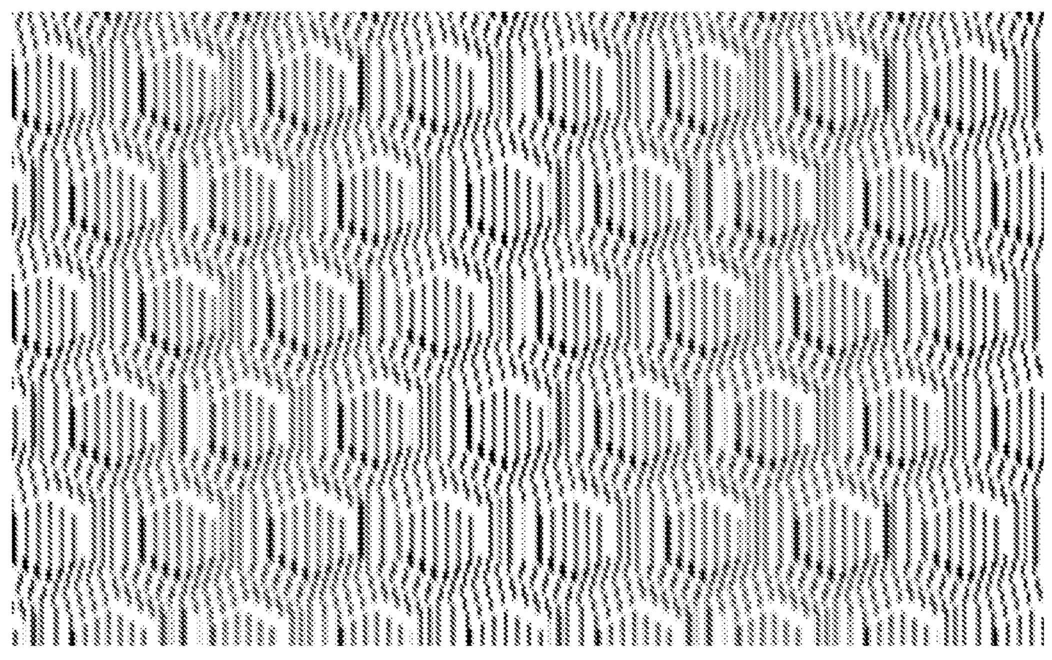
FIG. 8*a* is a planar view of a micro-texture layer according to an embodiment of the present disclosure.
Figure 8B:
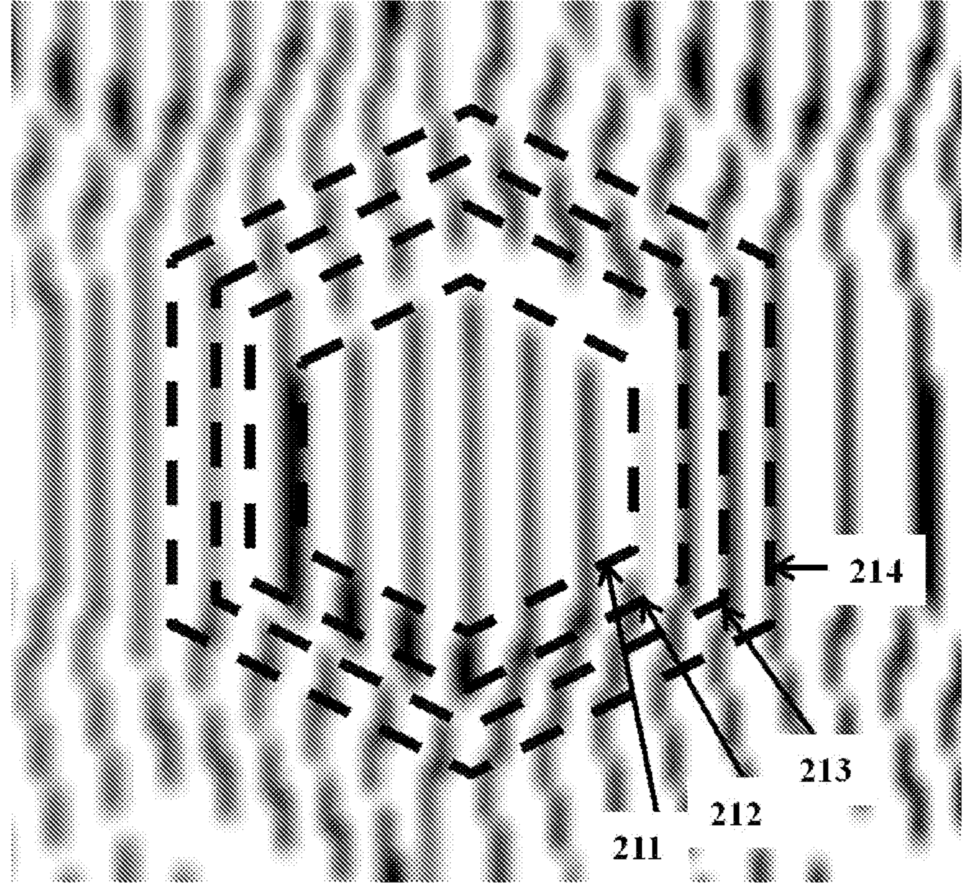
FIG. 8*b* is an enlarged view of a micro-texture unit as shown in FIG. 8*a*.

In an embodiment of the present disclosure, referring to FIG. 8*a* and FIG. 8*b*, the micro-texture layer includes a plurality of micro-texture units arranged in sequence, and each of the micro-texture units includes a first subunit 211, a second subunit 212, a third subunit 213, and a fourth subunit 214 nested in sequence. The micro-texture stripes of at least two different subunits have different patterns. Each of the micro-texture units has a plurality of micro-texture stripes. A gap exists between the micro-texture stripes of the first subunit 211 and the micro-texture stripes of the second subunit 212. Two connected micro-texture stripes of the second subunit 212 and the third subunit 213 extend in different directions. The micro-texture stripes have edges facing the outside of the subunit. A connecting line of the edges of the plurality of micro-texture stripes of the same subunit form a hexagon, the plurality of micro-texture stripes of the same subunit extend in the same direction, and the micro-texture stripes of different subunits of the micro-texture unit extend in different directions, so that the transparent plate with the above micro-texture layer realizes a rich dynamic visual effect.

Figures 11, 12:
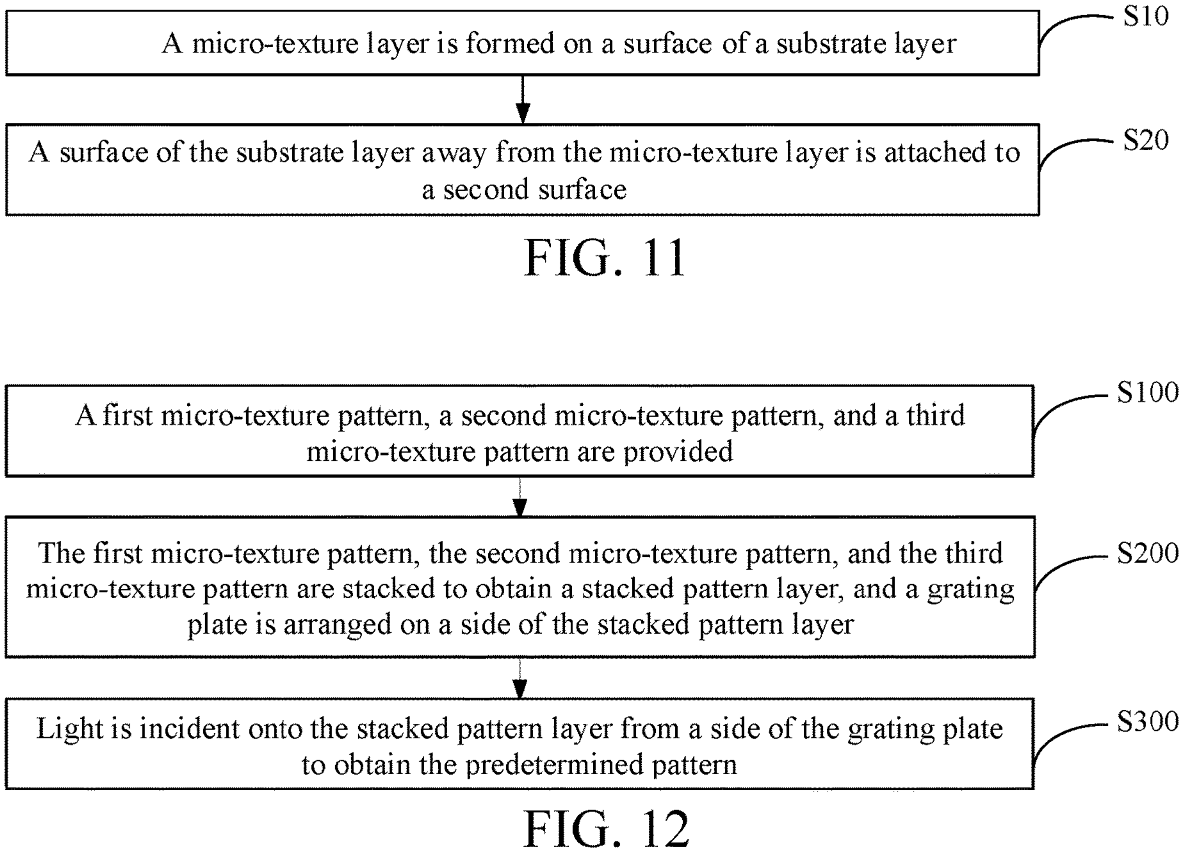
FIG. 11 is a flowchart of a method for fabricating a transparent plate according to an embodiment of the present disclosure.
FIG. 12 is a flowchart of a method for fabricating a transparent plate according to another embodiment of the present disclosure.

According to an embodiment of the present disclosure, referring to FIG. 12, a predetermined pattern jointly formed by the micro-texture stripes of the micro-texture layer is obtained through the following steps.

S100: A first micro-texture pattern, a second micro-texture pattern, and a third micro-texture pattern are provided, where the first micro-texture pattern, the second micro-texture pattern, and the third micro-texture pattern do not completely overlap. These micro-texture patterns may be prefabricated.

S200: The first micro-texture pattern, the second micro-texture pattern, and the third micro-texture pattern are stacked to obtain a stacked pattern layer, and a grating plate is arranged on a side of the stacked pattern layer.

S300: Light is incident onto the stacked pattern layer from a side of the grating plate to obtain the predetermined pattern.

Figures 13A, 13B, 13C, 13D:
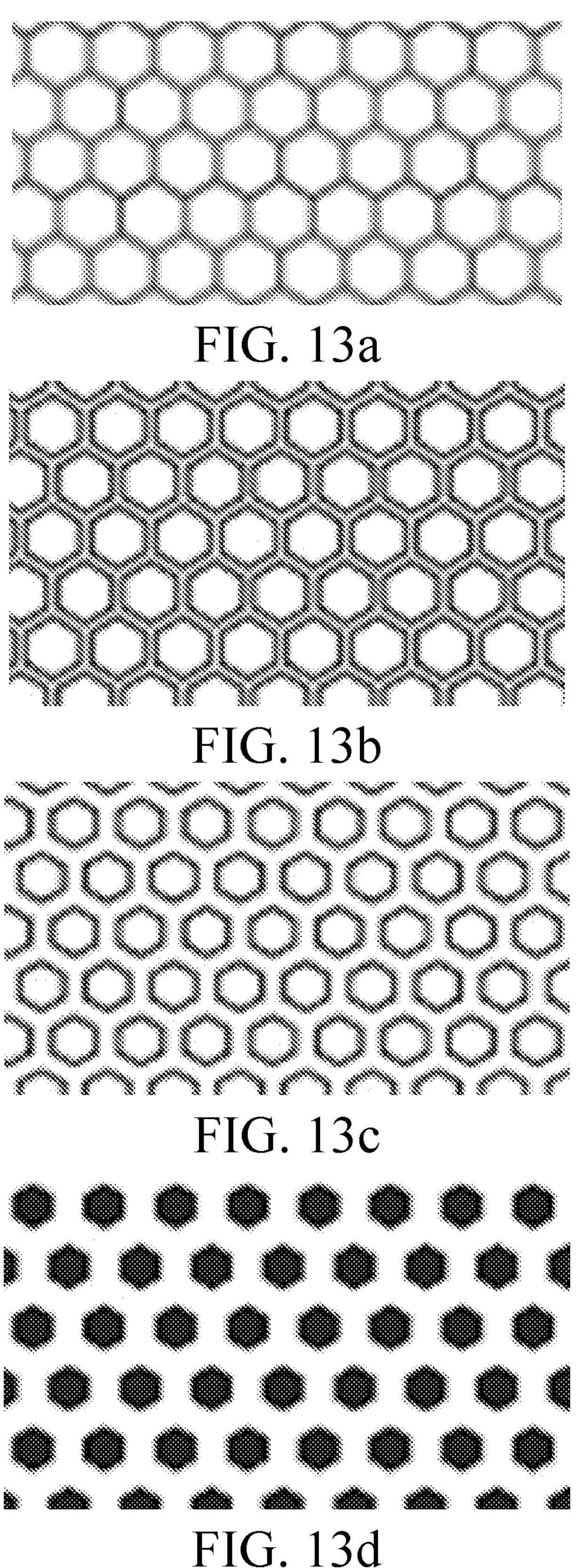
FIG. 13*a*, FIG. 13*b*, FIG. 13*c*, and FIG. 13*d* are schematic diagrams of planar views of a first micro-texture pattern, a second micro-texture pattern, a third micro-texture pattern, and a fourth micro-texture pattern according to embodiments of the present disclosure.

For example, in the embodiment described above, since each of the micro-texture units includes the first subunit 211, the second subunit 212, the third subunit 213, and the fourth subunit 214 nested in sequence, the first micro-texture pattern (for a structural schematic diagram, refer to FIG. 13*a*), the second micro-texture pattern (for a structural schematic diagram, refer to FIG. 13*b*), the third micro-texture pattern (for a structural schematic diagram, refer to FIG. 13*c*), and the fourth micro-texture pattern (for a structural schematic diagram, refer to FIG. 13*d*) need to be provided during designing of the micro-texture layer. The first micro-texture pattern, the second micro-texture pattern, the third micro-texture pattern, and the fourth micro-texture pattern do not completely overlap. The first micro-texture pattern, the second micro-texture pattern, the third micro-texture pattern, and the fourth micro-texture pattern are in a one-to-correspondence with the first subunit 211, the second subunit 212, the third subunit 213, and the fourth subunit 214 described above. After the micro-texture patterns are stacked and the light is incident onto the stacked pattern layer from a side of the grating plate, the predetermined pattern jointly formed by the above micro-texture stripes is obtained on the micro-texture layer 200. A function of the light in the grating plate and the stacked pattern layer may be an interference effect of the light in the above structures. In this case, the predetermined pattern is an interference fringe obtained after the light passes through the above structures. In this way, the predetermined pattern is obtained by splicing the four patterns described above. Through the coupling between the micro-texture layer with the predetermined pattern and the grating structure layer described above, when the user observes the transparent plate, as described above, the imaging focus changes to different degrees, so that a rich dynamic visual effect can be observed.

According to this embodiment of the present disclosure, the subunits described above satisfies at least one of the following conditions: an area of each of the subunits in the third micro-texture pattern is greater than an area of each of the subunits in the second micro-texture pattern, and an area of each of the subunits in the second micro-texture pattern is greater than an area of each of the subunits in the first micro-texture pattern; or the subunits in the first micro-texture pattern, the second micro-texture pattern, and the third micro-texture pattern have a same shape. That is to say, the plurality of micro-texture patterns have the same shape but different sizes. Since the plurality of micro-texture patterns are related to each other in the shape and size, through the coupling between the micro-texture layer with the predetermined pattern and the grating structure layer described above, when the user observes the transparent plate, a rolling dynamic visual effect similar can be observed.

According to this embodiment of the present disclosure, when the grating structure layer satisfies at least one of the following conditions, the mating between the micro-texture layer with the predetermined pattern and the grating structure layer described above can be more effective.

According to this embodiment of the present disclosure, when the plurality of micro-texture stripes have an equal width, a grating period is a product of a number of the subunits in each of the micro-texture units and the width of one micro-texture stripe. Specifically, when the width of the micro-texture stripe is D1, if a number of subunits in each of the micro-texture units is n, the mating between the micro-texture layer with the predetermined pattern and the grating structure layer described above can be most effective when a grating period is D1× N, thereby realizing a clearer and dynamic visual effect full of changes. In addition, in some specific embodiments of the present disclosure, the grating period may be more than 100 μm. In this way, not only a more desirable visual effect is realized, but also the grating structure can be more easily aligned during the formation, thereby facilitating the formation and industrialization.

In addition, according to this embodiment of the present disclosure, referring to FIG. 1, a thickness H of the grating structure layer 100 may range from 0.4 mm to 0.7 mm. Specifically, the thickness H of the grating structure layer 100 may be 0.4 mm, 0.5 mm, 0.6 mm, 0.7 mm, or the like. The grating structure may include a plurality of curved surfaces arranged in sequence and protruding away from the micro-texture layer 200, and a curvature radius R of each of the curved surfaces may range from 0.1 mm to 0.5 mm. Specifically, the curvature radius R of each of the curved surfaces may be 0.1 mm, 0.2 mm, 0.3 mm, 0.4 mm, 0.5 mm, or the like. In this way, the transparent plate 10 can realize a more desirable visual effect.

Figure 9:
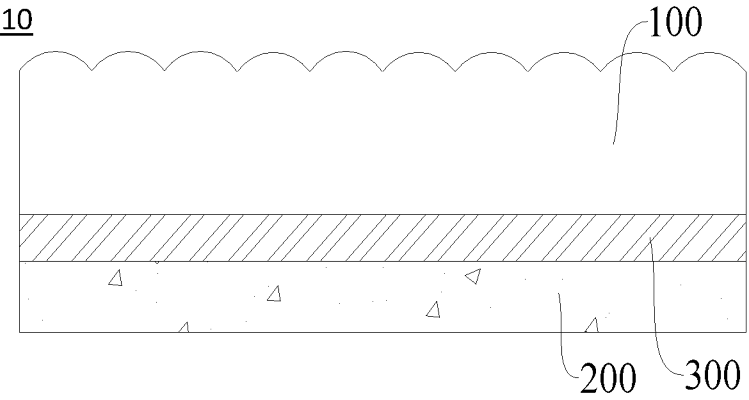
FIG. 9 is a schematic diagram of a cross-sectional view of a transparent plate according to another embodiment of the present disclosure.

In some embodiments of the present disclosure, referring to FIG. 9, the transparent plate 10 may further include a substrate layer 300 arranged between the grating structure layer 100 and the micro-texture layer 200. A material of the substrate layer 300 may be a PET sheet, a PC sheet, or the like. Therefore, a source of the material is wide, the material can be easily obtained, the cost is low, and the micro-texture stripes on the micro-texture layer can be easily formed, which facilitates industrialization.

Figure 10:
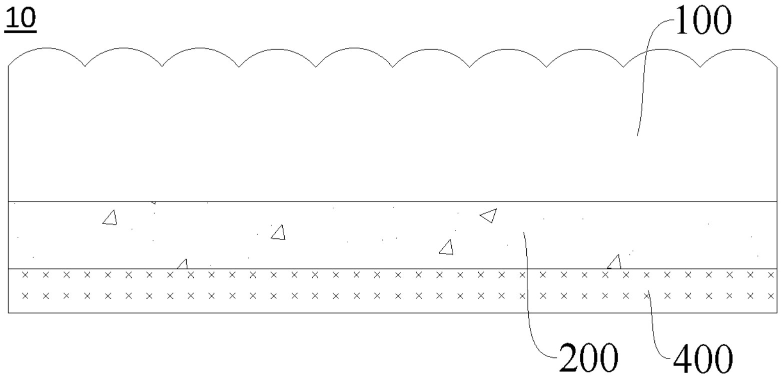
FIG. 10 is a schematic diagram of a cross-sectional view of a transparent plate according to another embodiment of the present disclosure.

In some embodiments of the present disclosure, referring to FIG. 10, the transparent plate 10 may further include an optical coating layer 400 arranged on a side of the micro-texture layer 200 away from the grating structure layer 100. In this way, different optical colors may be controlled through the optical coating layer 400, so that not only the above dynamic visual effect is realized, but also an electroplated reflecting effect can be realized. Therefore, the visual effect of the whole transparent plate is more desirable and expressive.

In another aspect of the present disclosure, the present disclosure provides a method for fabricating the transparent plate described above. According to an embodiment of the present disclosure, the method may include the following steps: forming a micro-texture layer 200 on a side of the second surface of the grating structure layer 100 to obtain the transparent plate 10 (for a schematic structural diagram, refer to FIG. 1). The method can be easily operated, has strong stability and a high yield, facilitates industrial production, and can effectively produce the transparent plate 10 described above.

According to an embodiment of the present disclosure, referring to FIG. 11, the method may include the following steps.

S10: The micro-texture layer is formed on a surface of the substrate layer.

According to this embodiment of the present disclosure, a process for forming the micro-texture layer includes a UV transfer process. Specifically, in some embodiments of the present disclosure, a plastic die is fabricated first. The plastic die is obtained by evenly applying a photoresist onto a substrate made of a flat material and etching the substrate through laser direct writing to form the predetermined pattern on the substrate. Then a layer of UV adhesive is coated on a surface of the substrate layer, and the plastic die is printed on a surface of the UV adhesive, and is finally solidified through a UV lamp and then demolded. The predetermined pattern is transferred on the substrate layer to form the micro-texture layer. The method can be easily operated, has strong stability and a high yield, and facilitates industrial production.

According to this embodiment of the present disclosure, the micro-texture stripes of the micro-texture layer jointly form the predetermined pattern. For specific designing of the predetermined pattern, refer to FIG. 12. Since the specific designing of the predetermined pattern has been described in the previous text in combination with the specific embodiment, the details are not repeated herein.

S20: A surface of the substrate layer away from the micro-texture layer is attached to the second surface.

According to this embodiment of the present disclosure, it may be understood that a process for attaching the surface of the substrate layer away from the micro-texture layer to the second surface may be a process of pasting the surface of the micro-texture layer through an OCA adhesive. Details of steps of the process are not described herein. The method can be easily operated, has a strong stability and a high yield, and facilitates industrial production.

Figure 14:
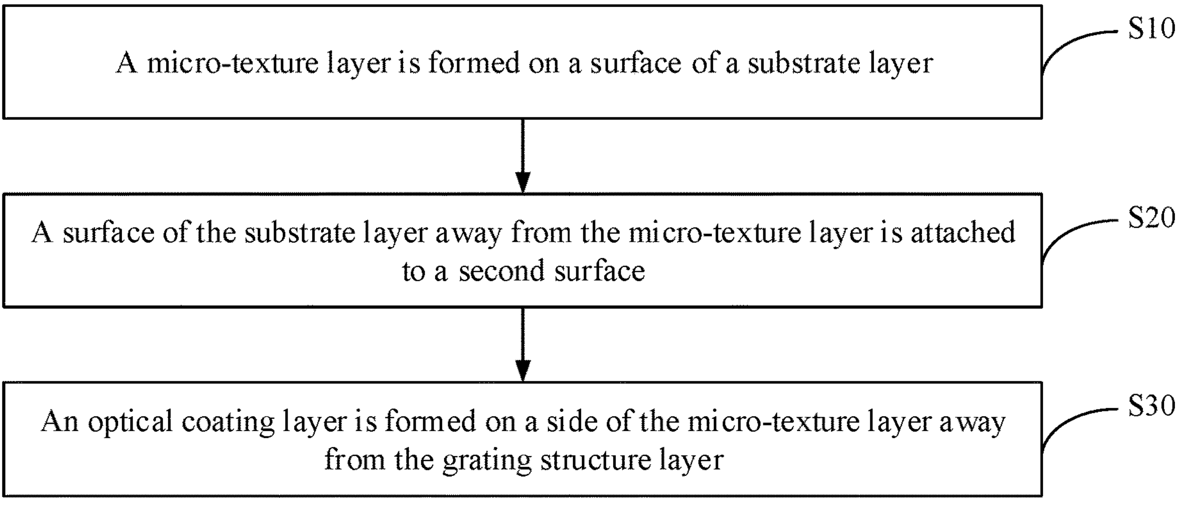
FIG. 14 is a flowchart of a method for fabricating a transparent plate according to another embodiment of the present disclosure.

In some embodiments of the present disclosure, referring to FIG. 14, the method may further include the following steps.

S30: An optical coating layer is formed on a side of the micro-texture layer away from the grating structure layer.

According to this embodiment of the present disclosure, it may be understood that the process for forming the optical coating layer may include an Non-Conductive Vacuum Metallization. In some examples of the present disclosure, the electroless plating technology may be a magnetron sputtering technology or an electron gun evaporation plating technology. A process condition of the plating technology may be flexibly selected by a person skilled in the art according to actual requirements, and the details are not described herein. The method has simple and convenient operations, can be easily realized, facilitates industrial production, can effectively produce the optical coating layer, and has low costs and a high yield.

In addition, according to this embodiment of the present disclosure, a person skilled in the art may understand that the grating structure on the grating structure layer may be formed through etching on an upper surface of flat glass or 3D glass. The process steps, conditions, and parameters of the etching process may be flexibly selected by a person skilled in the art according to actual requirements, and the details are not described herein.

In another aspect of the present disclosure, the present disclosure provides a housing. According to an embodiment of the present disclosure, the housing includes the transparent plate described above. The housing has a simple structure, can realize a dynamic visual effect and an expressive effect, and has the features and advantages of the transparent plate described above, which are not repeated herein.

According to this embodiment of the present disclosure, it may be understood that in addition to the above structure, the housing may include structures and components of other conventional housings, and the details are not described herein.

In another aspect of the present disclosure, the present disclosure provides a mobile terminal. According to an embodiment of the present disclosure, the mobile terminal includes the housing described above. The mobile terminal can realize a dynamic visual effect and an expressive effect, and has the features and advantages of the housing described above, which are not repeated herein.

According to this embodiment of the present disclosure, it may be understood that in addition to the above structure, the mobile terminal may include structures and components of other conventional mobile terminals, and the details are not described herein.

According to this embodiment of the present disclosure, the mobile terminal may include but is not limited to a mobile phone, a tablet, a game console, and a smart watch. Therefore, the application range is large.

In the description of the present disclosure, it is to be noted that, the terms "first" and "second" are merely used for description and are not to be construed as indicating or implying relative importance or implicitly specifying the number of technical features that are indicated. Therefore, a feature limited by "first" or "second" may explicitly or implicitly include one or more features. In the description of the present disclosure, "a plurality of" means two or more, unless otherwise definitely and specifically defined.

In the description of the present disclosure, description of a reference term such as "an embodiment," "some embodiments," "an example," "a specific example," or "some examples" means that specific features, structures, materials, or characteristics described with reference to the embodiment or the example is included in at least one embodiment or example of the present disclosure. In this specification, schematic description of the above terms is not necessarily directed at the same embodiment or example. Besides, the specific features, structures, materials, or characteristics that are described may be combined in proper manners in any one or more embodiments or examples. In addition, a person skilled in the art may integrate or combine different embodiments or examples described in the specification and features of the different embodiments or examples as long as they are not contradictory to each other.

Although the embodiments of the present disclosure have been shown and described above, it may be understood that, the above embodiments are exemplary and are not a limitation on the present disclosure. A person of ordinary skill in the art may make changes, modifications, replacements, or variations to the above embodiments within the scope of the present disclosure.

What is claimed is:

1. A transparent plate, comprising:

a grating structure layer, comprising a first surface and a second surface opposite to each other, wherein a grating structure is disposed on the first surface; and a micro-texture layer, disposed on the second surface, wherein the micro-texture layer comprises a plurality of micro-texture units, each of the micro-texture units comprises a plurality of subunits, a surface of the micro-texture layer away from the second surface comprises a plurality of micro-texture stripes, the micro-texture stripes have an equal width, a grating period of the grating structure is a product of a number of the subunits in each of the micro-texture units and the width, and light interferes between the grating structure and the micro-texture layer and forms moire stripes.

2. The transparent plate according to claim 1, wherein the plurality of subunits comprises at least a first subunit, a second subunit, and a third subunit nested in sequence, and the first subunit, the second subunit, and the third subunit comprise the micro-texture stripes, and micro-texture stripes of at least two of the plurality of subunits have different patterns.

3. The transparent plate according to claim 2, wherein the micro-texture layer further comprises a fourth subunit, and the third subunit is disposed within edges of the fourth subunit.

4. The transparent plate according to claim 2, wherein:

a gap is formed between first micro-texture stripes of a first one of two adjacent subunits and second micro-texture stripes of a second one of the two adjacent subunits in a same micro-texture unit; or a first micro-texture stripe of a first one of two adjacent subunits and a second micro-texture stripe of a second one of the two adjacent subunits in a same micro-texture unit that are connected to each other extend in different directions; or the micro-texture stripes of two adjacent subunits in a same micro-texture unit are connected at a connecting portion, wherein two ends of the connecting portion are respectively connected with first micro-texture stripes of a first one of the two adjacent subunits and second micro-texture stripes of a second one of the two adjacent subunits, and a width of the connecting portion is not greater than half of a width of each of the micro-texture stripes of the two adjacent subunits.

5. The transparent plate according to claim 2, wherein a connecting line of edges of micro-texture stripes of one of the subunits at an outer boundary of the one of the subunits forms a polygon or a circle, and polygons formed by different subunits have an equal number of sides.

6. The transparent plate according to claim 5, wherein:

the micro-texture stripes are straight stripes, and first micro-texture stripes of a first one of two adjacent subunits and second micro-texture stripes of a second one of the two adjacent subunits in a same micro-texture unit extend in different directions; or the micro-texture stripes are curved stripes, and third micro-texture curved stripes of a first one of at least two of the subunits and fourth micro-texture curved stripes of a second one of the at least two of the subunits in a same micro-texture unit have different curvatures.

7. The transparent plate according to claim 6, wherein micro-texture stripes located in a subunit extend in a same direction.

8. The transparent plate according to claim 5, wherein the polygon comprises a shape of at least one of a triangle, a quadrilateral, a pentagon, a hexagon, or a star.

9. The transparent plate according to claim 2, wherein:

the grating structure layer has a thickness ranging from 0.4 mm to 0.7 mm; or the grating structure comprises a plurality of curved surfaces and protruding away from the micro-texture layer, and a curvature radius of each of the curved surfaces ranges from 0.1 mm to 0.5 mm.

10. The transparent plate according to claim 1, further comprising:

a substrate layer, arranged between the grating structure layer and the micro-texture layer; or an optical coating layer, arranged on a side of the micro-texture layer away from the grating structure layer.

11. A method for preparing the transparent plate according to claim 1, comprising:

forming the micro-texture layer on the second surface of the grating structure layer to obtain the transparent plate.

12. The method according to claim 11, further comprising:

forming the micro-texture layer on a surface of a substrate layer; and attaching a surface of the substrate layer away from the micro-texture layer to the second surface.

13. The method according to claim 11, wherein forming the micro-texture layer comprises a UV transfer process.

14. The method according to claim 11, wherein the micro-texture stripes of the micro-texture layer form a pattern through the following:

providing a first micro-texture pattern, a second micro-texture pattern, and a third micro-texture pattern, wherein the first micro-texture pattern, the second micro-texture pattern, and the third micro-texture pattern do not completely overlap;

stacking the first micro-texture pattern, the second micro-texture pattern, and the third micro-texture pattern to obtain a stacked pattern layer, and disposing a grating plate on a side of the stacked pattern layer; and illuminating light into the stacked pattern layer from a side of the grating plate to obtain the pattern on the micro-texture layer.

15. The method according to claim 14, wherein each of the first micro-texture pattern, the second micro-texture pattern, and the third micro-texture pattern comprises a plurality of pattern subunits, and the pattern subunits comprise at least one of the following:

an area of each of the pattern subunits in the third micro-texture pattern is greater than an area of each of the pattern subunits in the second micro-texture pattern, and an area of each of the pattern subunits in the second micro-texture pattern is greater than an area of each of the pattern subunits in the first micro-texture pattern; or the pattern subunits in the first micro-texture pattern, the pattern subunits in the second micro-texture pattern, and the pattern subunits in the third micro-texture pattern have the same shape.

16. The method according to claim 11, further comprising:

forming an optical coating layer on a side of the micro-texture layer away from the grating structure layer.

17. A housing, comprising a transparent plate, wherein the transparent plate comprises:

a grating structure layer, comprising a first surface and a second surface opposite to each other, wherein a grating structure is disposed on the first surface; and a micro-texture layer, disposed on the second surface, wherein the micro-texture layer comprises a plurality of micro-texture units, each of the micro-texture units comprises a plurality of subunits, a surface of the micro-texture layer away from the second surface comprises a plurality of micro-texture stripes, the micro-texture stripes have an equal width, a grating period of the grating structure is a product of a number of the subunits in each of the micro-texture units and the width, and light interferes between the grating structure and the micro-texture layer and forms moire stripes.

18. The housing according to claim 17, wherein the plurality of subunits comprises at least a first subunit, a second subunit, and a third subunit nested in sequence, and the first subunit, the second subunit, and the third subunit comprise the micro-texture stripes, and micro-texture stripes of at least two of the plurality of subunits have different patterns.

19. The housing according to claim 18, wherein the micro-texture layer further comprises a fourth subunit, and the third subunit is disposed within edges of the fourth subunit.

20. A mobile terminal, comprising a housing comprising a transparent plate, wherein the transparent plate comprises:

a grating structure layer, comprising a first surface and a second surface opposite to each other, wherein a grating structure is disposed on the first surface; and a micro-texture layer, disposed on the second surface, wherein the micro-texture layer comprises a plurality of micro-texture units, each of the micro-texture units comprises a plurality of subunits, a surface of the micro-texture layer away from the second surface comprises a plurality of micro-texture stripes, the micro-texture stripes have an equal width, a grating period of the grating structure is a product of a number of the subunits in each of the micro-texture units and the width, and light interferes between the grating structure and the micro-texture layer and forms moire stripes.

* * * * *